(12) United States Patent
Harada

(10) Patent No.: US 10,481,524 B2
(45) Date of Patent: Nov. 19, 2019

(54) COMPONENT WITH SHEET MATERIAL ADHERED TO SURFACE THEREOF

(71) Applicant: KYOCERA Document Solutions Inc., Osaka (JP)

(72) Inventor: Yuzo Harada, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/133,786

(22) Filed: Sep. 18, 2018

(65) Prior Publication Data

US 2019/0094755 A1    Mar. 28, 2019

(30) Foreign Application Priority Data

Sep. 27, 2017  (JP) .................................. 2017-186047

(51) Int. Cl.
　　*G03G 15/08*　　(2006.01)
　　*G03G 21/18*　　(2006.01)
　　*B65D 77/20*　　(2006.01)

(52) U.S. Cl.
　　CPC ....... *G03G 15/0863* (2013.01); *B65D 77/204* (2013.01); *G03G 15/0894* (2013.01); *G03G 21/181* (2013.01); *G03G 21/1875* (2013.01); *B32B 2519/00* (2013.01); *C09J 2203/334* (2013.01); *G03G 2215/00987* (2013.01); *G03G 2215/0695* (2013.01)

(58) Field of Classification Search
　　CPC ........... G03G 15/0863; G03G 15/0894; G03G 21/181; G03G 21/1875; G03G 21/1885; G03G 21/1896; G03G 2215/00987; G03G 2215/0695; B32B 2519/00; C09J 2203/334
　　USPC .............. 399/12, 111, 119, 262; 222/DIG. 1
　　See application file for complete search history.

(56) References Cited

U.S. PATENT DOCUMENTS

| 2005/0002684 | A1* | 1/2005 | Suzuki ................. B41J 2/17506 |
| | | | 399/109 |
| 2005/0141915 | A1* | 6/2005 | Okamoto ........... G03G 15/0896 |
| | | | 399/103 |
| 2017/0080698 | A1 | 3/2017 | Wada et al. |
| 2017/0132954 | A1* | 5/2017 | Birk ..................... B65D 77/225 |

FOREIGN PATENT DOCUMENTS

| JP | 07072692 | A | * | 3/1995 |
| JP | 07334090 | A | * | 12/1995 |
| JP | 09190135 | A | * | 7/1997 |
| JP | 10250188 | A | * | 9/1998 |

(Continued)

*Primary Examiner* — Robert B Beatty
(74) *Attorney, Agent, or Firm* — Wenderoth, Lind & Ponack, L.L.P.

(57) ABSTRACT

A component has a surface to which a sheet material having an adhesive surface is adhered, and an adhesive target region on a surface of the component, to which the sheet material is adhered, is provided at the peripheral edge thereof with a first region and a second region. The first region includes a recess that allows a predetermined sheet material peeling tool to be insertable to a side of the adhesive surface of the sheet material. The second region is positioned in the vicinity of the first region, and includes a region not in contact with the adhesive surface of the sheet material or a region mixedly including a part in contact with the adhesive surface and a part not in contact with the adhesive surface.

5 Claims, 10 Drawing Sheets

(56) References Cited

FOREIGN PATENT DOCUMENTS

| JP | 2000043177 A | * | 2/2000 |
| JP | 2003218548 A | * | 7/2003 |
| JP | 2003308020 A | * | 10/2003 |
| JP | 2005-241960 | | 9/2005 |
| JP | 2006064936 A | * | 3/2006 |
| JP | 2008083113 A | * | 4/2008 |
| KR | 20-2013-0002699 | | 5/2013 |
| WO | 2014/105433 | | 7/2014 |

* cited by examiner

COMPONENT WITH SHEET MATERIAL ADHERED TO SURFACE THEREOF

CROSS-REFERENCE TO RELATED APPLICATION

This application is based upon and claims the benefit of priority from Japanese Patent Application No. 2017-186047 filed on Sep. 27, 2017, the entire contents of which are incorporated herein by reference.

BACKGROUND

The technology of the present disclosure relates to a component with a sheet material adhered to the surface thereof.

In the related art, there has been known a sheet material adhered to a surface of a component to attract attention or display an operation procedure and the like. There are cases where the sheet material displays information on a component (for example, a component number, a manufacturing number, a material, and a manufacturer), information on OA equipment and various units to be installed (for example, standards and specifications), and the like.

The sheet material needs to be peeled off from the surface of the component for removal at the time of disposal or recycling of the component. In this regard, there has been proposed various technologies for easily peeling off the sheet material from the component.

In an example, there has been proposed a technology for widely forming the edge of one corner of a seat of a sheet material on a surface of a component. In this way, one corner of the sheet material is scratched and peeled with a fingertip, so that the sheet material can be easily peeled off from the seat.

SUMMARY

The technology of the present disclosure relates to a component having a surface to which a sheet material having an adhesive surface is adhered.

An adhesive target region on a surface of the component, to which the sheet material is adhered, is provided at the peripheral edge thereof with a first region and a second region. The first region includes a recess that allows a predetermined sheet material peeling tool to be insertable to a side of the adhesive surface of the sheet material. The second regions is positioned in the vicinity of the first region. The second region includes a region not in contact with the adhesive surface of the sheet material or a region mixedly including a part in contact with the adhesive surface and a part not in contact with the adhesive surface.

DETAILED DESCRIPTION

Hereinafter, an example of an embodiment will be described in detail on the basis of the drawings. It is noted that the technical scope of the present disclosure is not limited to the following embodiments.

<<Embodiment>>

Figure 1:
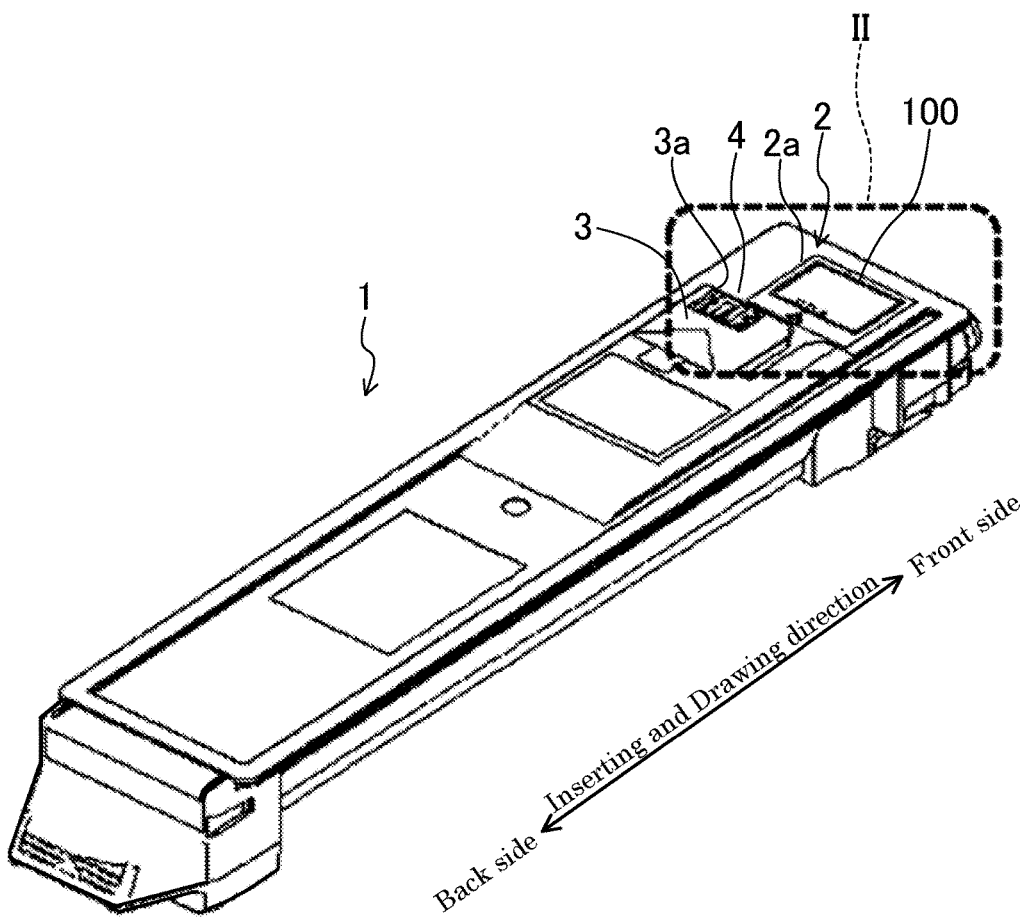
FIG. 1 is an external appearance perspective view illustrating a toner container which is an example of a component having a surface, to which a sheet material is adhered, in an embodiment.

FIG. 1 illustrates a toner container 1 which is an example of a component having a surface, to which a sheet material 100 is adhered, in an embodiment.

The sheet material 100 has an approximately rectangular shape and an entire rear side of the sheet material 100 is an adhesive surface 100*a*. On the front side of the sheet material 100, information on the toner container 1 (a component), information on OA equipment and various units in which the toner container 1 is installed, an operation procedure, attention attraction display and the like are specified by printing and the like. The adhesive surface 100*a*, for example, may be provided only at a peripheral edge of the sheet material 100, as well as the entire rear side of the sheet material 100.

The toner container 1 is detachably mounted in an electrophotographic image forming apparatus. The toner container 1 stores printing toner therein. The toner container 1 is formed by an injection molding made of a resin material such as polycarbonate (PC) and acrylonitrile-butadiene-styrene copolymer (ABS). The toner container 1 is a flat rectangular parallelepiped-like case body and is mounted at a container mounting part of the image forming apparatus so as to be able to be inserted and drawn. The longitudinal direction of the toner container 1 coincides with the inserting and drawing direction thereof. In the following description, a front side and a rear side indicate a front side and a back side in the inserting and drawing direction of the toner container 1 and a left side and a right side indicate a left side and a right side when the toner container 1 is viewed from the front side.

Figure 2:
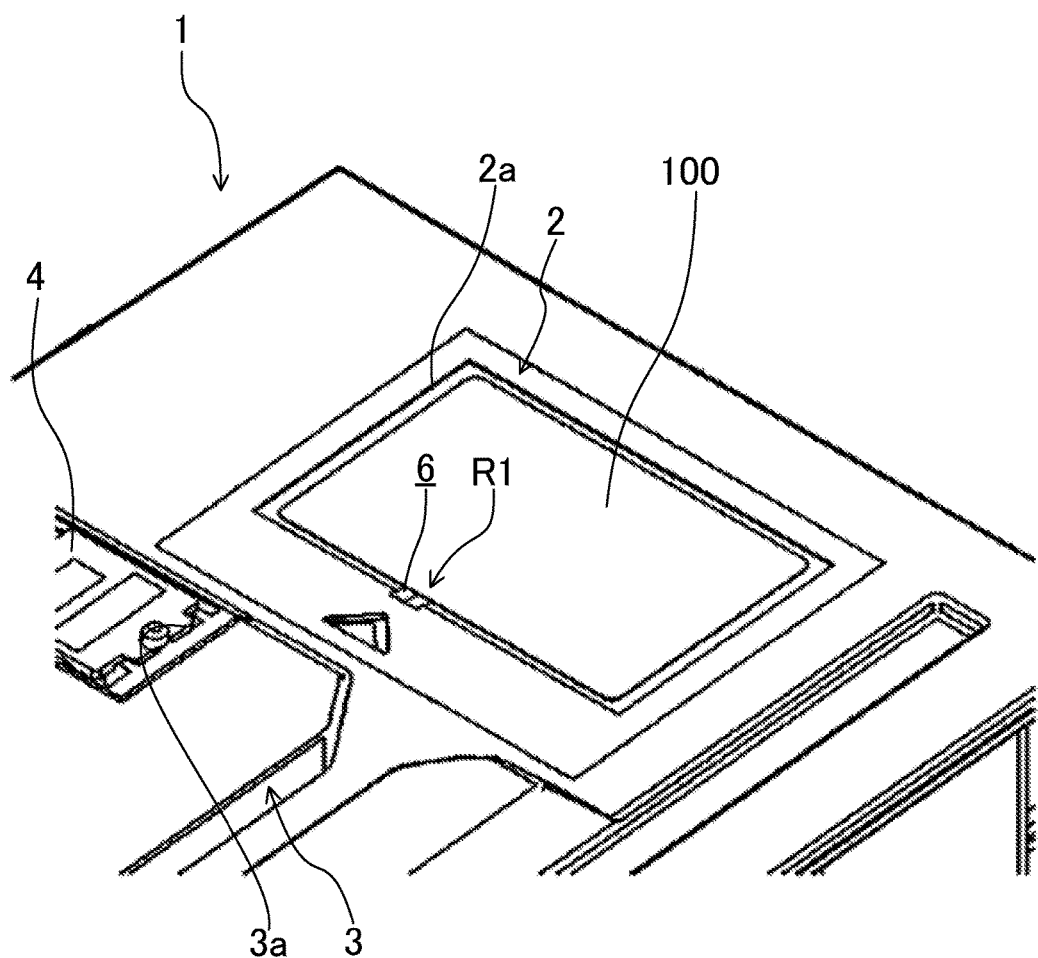
FIG. 2 is an enlarged perspective view of a part II of FIG. 1.

As illustrated in FIG. 2, the toner container 1 is formed at the front end part on the upper surface thereof with a rectangular dish-like recess 2. A bottom surface of the recess 2 constitutes a seat surface 2*a* to which the sheet material 100 is adhered. The recess 2 is formed to be slightly larger than the sheet material 100 in a plan view. The recess 2 is provided, so that a worker can easily grasp a place, where the sheet material 100 is attached, when the toner container 1 is assembled. A depth of the recess 2 is identical to or slightly larger than a thickness of the sheet material 100. In this way, when the toner container 1 is inserted and drawn into/from the container mounting part of the image forming apparatus, the sheet material 100 is avoided from being hooked to an inner wall surface of the mounting part and being peeled off.

The toner container 1 is provided on the upper surface thereof with a rectangular plate-like stepped part 3 behind the recess 2. An upper surface of the stepped part 3 is in a position higher than the seat surface 2*a* which is the bottom surface of the recess 2. The stepped part 3 is formed on the upper surface thereof with a board accommodating recess 3a into which a communication board 4 is fitted. A height of the stepped part 3 is set to an optimal height such that the communication board 4 is positioned at a predetermined height. The communication board 4 transmits identification information toward the image forming apparatus when the toner container 1 is in a mounting state. A communication unit of the image forming apparatus identifies whether the toner container 1 is a genuine product (that is, the toner container 1 is a forgery or a non-regular article) based on the identification information received from the communication board 4.

Figure 3:
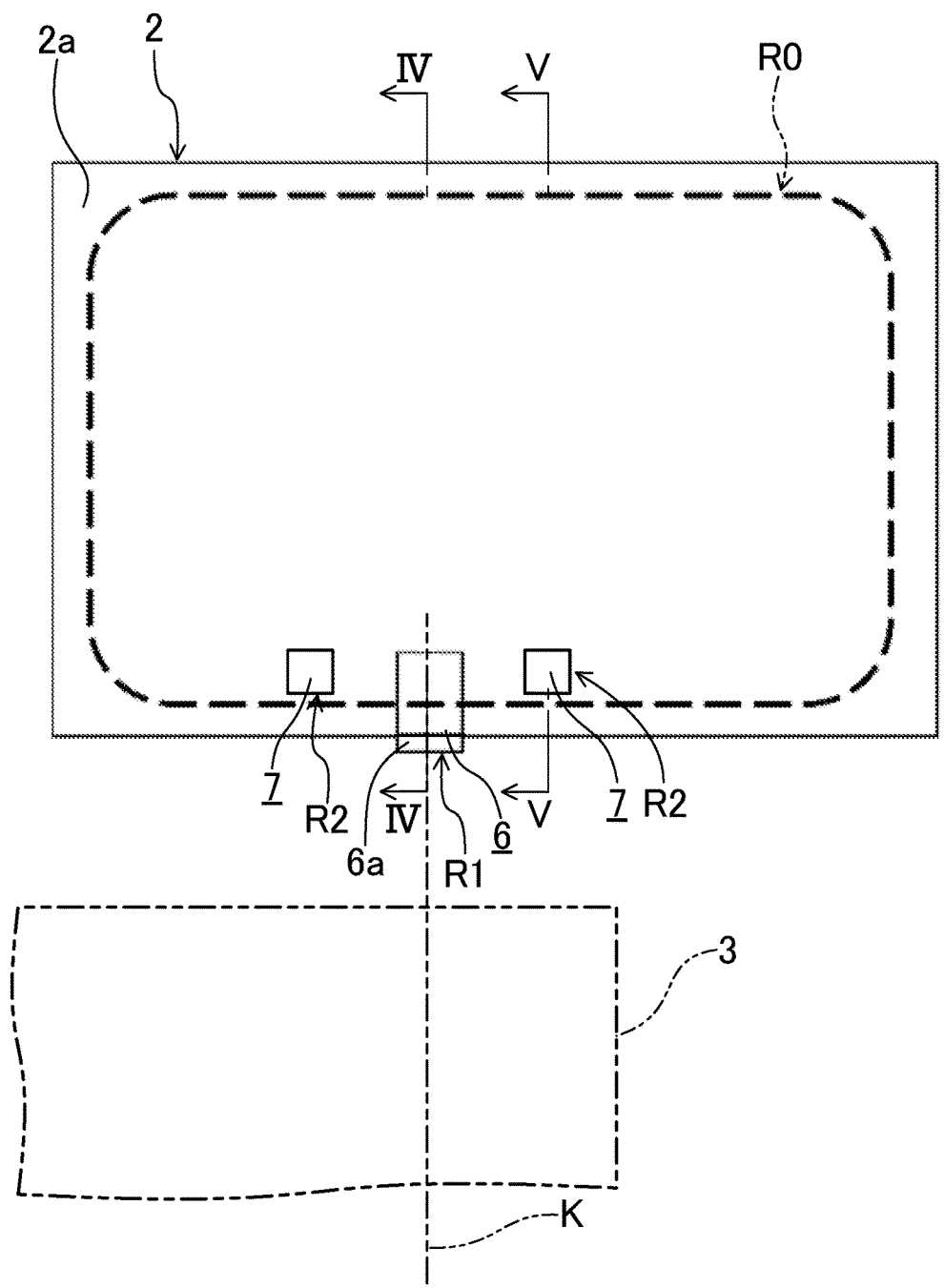
FIG. 3 is an enlarged plan view of an adhesive target region of a sheet material and a peripheral part thereof on an upper surface of a toner container.

As illustrated in FIG. 3, the toner container 1 is provided on the upper surface thereof with a first region R1 and second regions R2 for easily peeling off the sheet material 100 at the time of disposal or recycling of the toner container 1.

Figure 4:
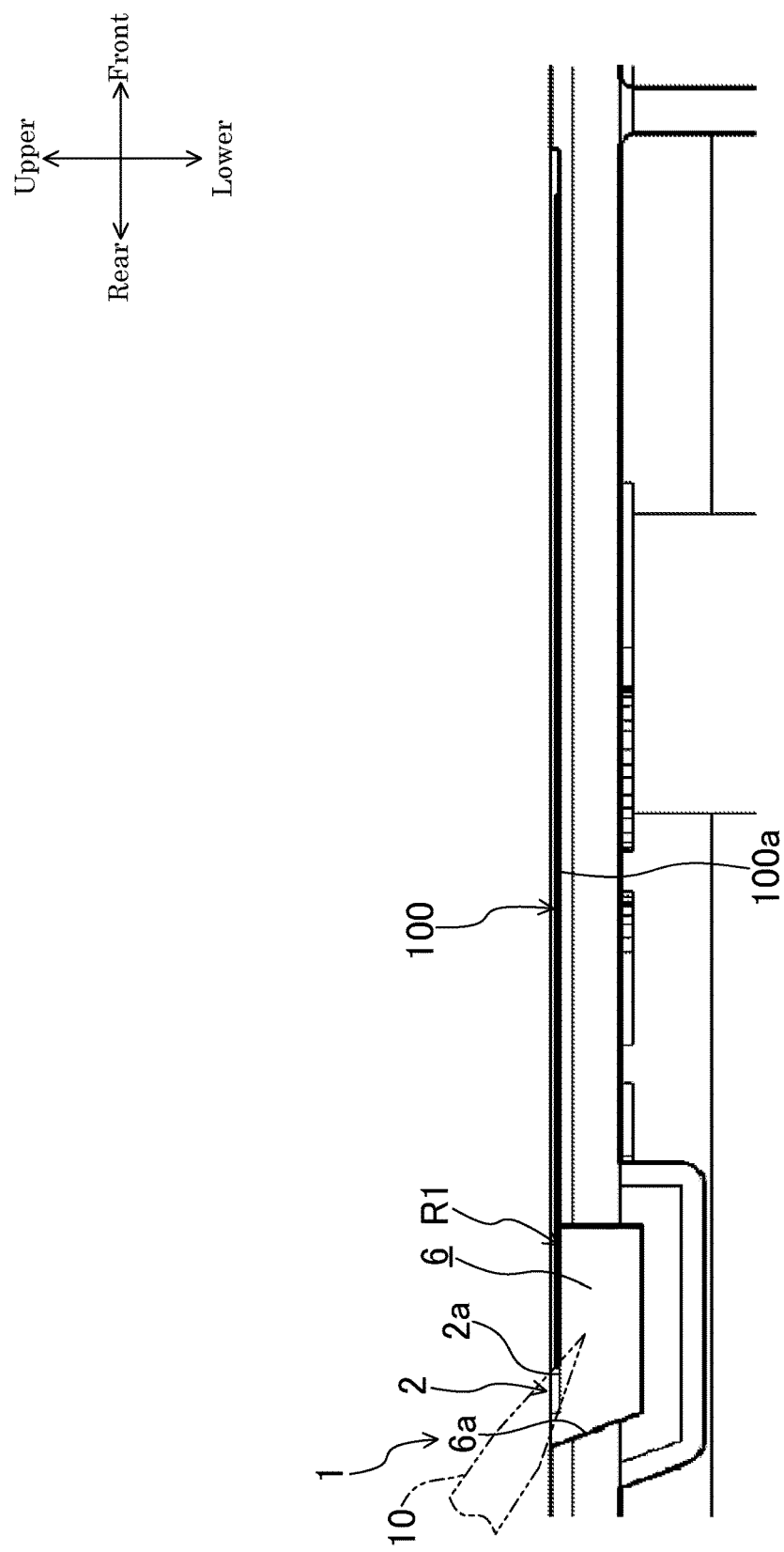
FIG. 4 is a sectional view taken along line IV-IV of FIG. 3.
Figure 5:
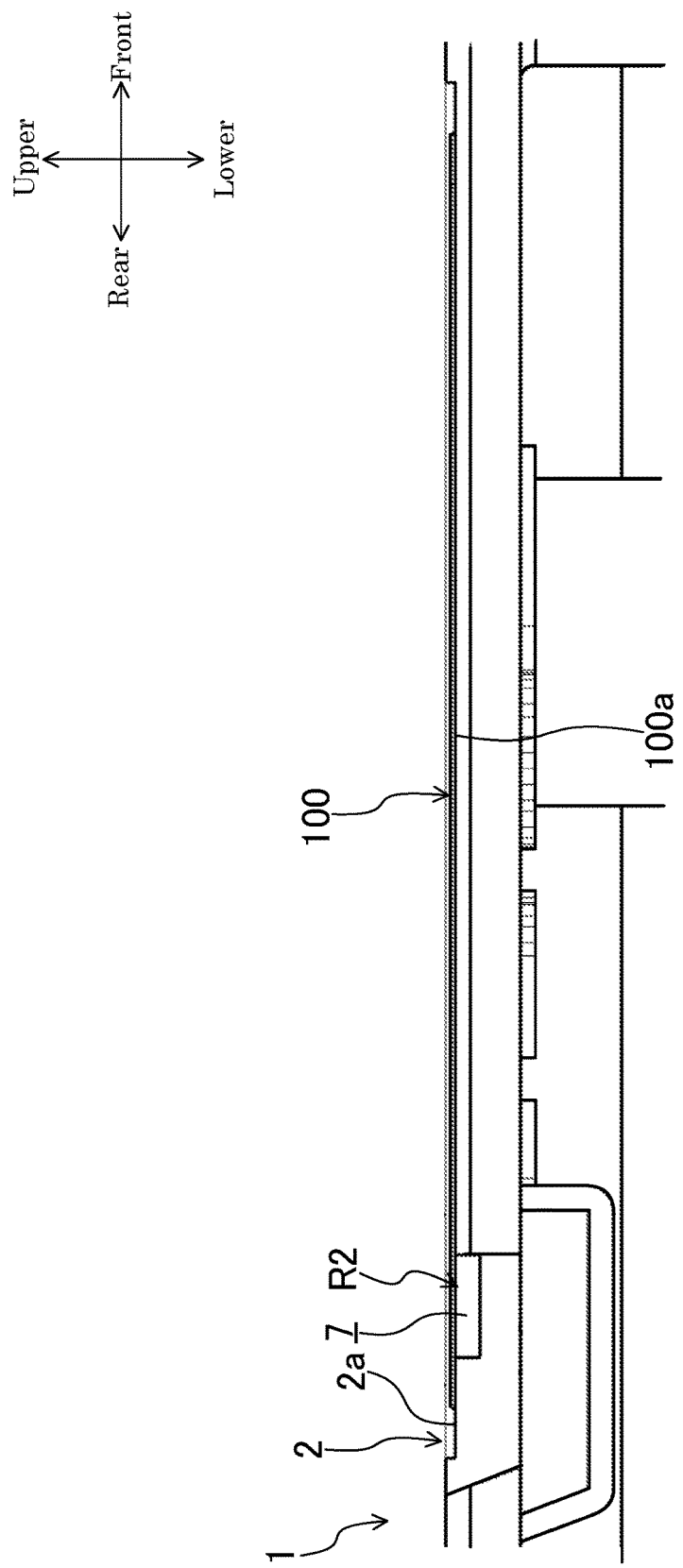
FIG. 5 is a sectional view taken along line V-V of FIG. 3.

The first region R1 includes a recess 6 opened upward. The recess 6 is provided at a peripheral edge of an adhesive target region R0 (see FIG. 3) of the sheet material 100 on the upper surface of the toner container 1. A worker can insert a predetermined sheet material peeling tool 10 (see FIG. 4) into the adhesive surface 100a side of the sheet material 100 from the recess 6. As the predetermined sheet material peeling tool 10, for example, a sharply pointed rod-like member can be employed, and a ballpoint pen can also be used as well as a dedicated tool.

As illustrated in FIG. 3, the recess 6 has a rectangular shape extending in a front and rear direction in the plan view. The recess 6 intersect a rear end edge of the adhesive target region R0 of the sheet material 100 in the plan view. The recess 6 has a rectangular bottom wall surface and four sidewall surfaces upright from the four sides of the bottom wall surface. Among the four sidewall surfaces, a rear sidewall surface 6a (see FIG. 4) is inclined downward toward the front side from the rear side. In other words, the rear sidewall surface 6a is inclined to the bottom side of the recess 6 toward an inner side from an outer side in the intersection direction of the recess 6 with respect to the rear end edge of the adhesive target region R0. Moreover, in other words, the rear sidewall surface 6a serves as an inclined surface which is lowered toward a back side in an insertion direction of the sheet material peeling tool 10. In the plan view, the recess 6 is arranged such that the stepped part 3 is positioned on a straight line K passing through a center position in a width direction of the recess 6 and extending in the front and rear direction in the plan view.

Next, the second region R2 will be described. In the present embodiment, two second regions R2 are provided. The second regions R2 are regions not in contact with the adhesive surface 100a of the sheet material 100. Specifically, each second region R2 includes a recess 7 opened upward. The recess 7 has a bottom surface having an approximately square shape and four sidewall surfaces vertically upright from four sides of the bottom surface in the plan view. The number of the second regions R2 is not limited to 2, and may be one or three or more.

As illustrated in FIG. 3, each second region R2 is provided in the vicinity of the first region R1 in the adhesive target region R0 of the sheet material 100. The two second regions R2 are arranged spaced apart from each other in the right and left direction along the rear end edge of the adhesive target region R0 of the sheet material 100. The two second regions R2 are bilaterally symmetrically arranged while interposing the first region R1 therebetween in the plan view. Preferably, a separation distance of each second region R2 in the right and left direction with respect to the first region R1, for example, is 10 mm or less. A rear end position of each second region R2 is positioned between a front end position and a rear end position of the first region R1. A front end position of each second region R2 coincides with the front end position of the first region R1.

When the sheet material 100 is attached to the toner container 1 configured as above, the position of one of two long sides of the adhesive surface 100a of the sheet material 100 is aligned with a slightly rear side of the rear end edge of the second region R2 in a state in which the adhesive surface 100a is directed downward. Then, the sheet material 100 is attached to the upper surface of the toner container 1 while carefully paying attention in order to prevent the sheet material 100 from being deviated from the seat surface 2a.

On the other hand, when the sheet material 100 is peeled off from the seat surface 2a, the sheet material peeling tool (see a two dot chain line of FIG. 4) having a sharply pointed and rod shape is prepared in advance for example. Then, the distal end of the sheet material peeling tool 10 is inserted into the recess 6 (the first region R1). Then, in a state in which an intermediate part of the sheet material peeling tool 10 has abutted the corner of the front side of the stepped part 3, a base end part of the sheet material peeling tool 10 is pressed down. By so doing, the distal end of the sheet material peeling tool 10 is pressed up by the principle of leverage by employing an abutting part with the stepped part 3 as a fulcrum. In this way, a part of the rear end edge of the sheet material 100, which is positioned in the vicinity of the recess 6, is peeled off from the seat surface 2a by the distal end of the sheet material peeling tool 10. Then, a worker picks a part, from which the sheet material 100 has been separated, with his/her finger and pulls the part frontward and upward, thereby extending the separation range of the sheet material 100 from the rear end side to the front end side. In this case, when adhesive force of the sheet material 100 is strong, it is probable that the sheet material 100 will be forcibly peeled and will be torn. When the adhesive force of the sheet material 100 is weak, such a problem hardly occurs, but since the sheet material 100 is easily peeled off, it is not preferable from the standpoint of ensuring functionality (an operation description function and an attention attracting function).

In contrast, in the present embodiment, the second region R2 (the recess 7), which is not in contact with the adhesive surface 100a of the sheet material 100, is provided in the vicinity of the first region R1 on the upper surface of the toner container 1. In this way, when an initial separation part of the sheet material 100 is picked by a finger and is pulled, a part corresponding to the second region R2 of the sheet material 100 is easily separated, so that the sheet material 100 can be prevented from being torn due to excessive tension acting thereon.

Furthermore, in the present embodiment, two second regions R2 are provided. The two second regions R2 are juxtaposed along the rear end edge of the adhesive target region R0 so as to be bilaterally symmetrically positioned while interposing the first region R1 therebetween.

According to such a configuration, when the initial separation part (a part corresponding to the first region R1) of the sheet material 100 is picked by a finger and is pulled, the sheet material 100 can be peeled off equally on both right and left sides by employing parts corresponding to the second regions R2 as starting points. Consequently, it is possible to prevent the separation region of the sheet material 100 from being biased to one of right and left sides and thus the sheet material 100 from being torn in an initial step of peeling work of the sheet material 100.

Furthermore, in the present embodiment, the recess 6 constituting the first region R1 is formed to intersect the rear end edge of the adhesive target region R0 when viewed from above (when viewed from the vertical direction of the adhesive target region R0). Furthermore, the rear sidewall surface 6a (a wall surface positioned at an outer side of the adhesive target region R0 in the intersection direction) of the recess 6 serves as an inclined surface inclined to the bottom side of the recess 6 toward the front side from the rear side (toward an inner side from an outer side in the intersection direction).

According to such a configuration, since a worker can see the rear sidewall surface 6a (the inclined surface) with his/her eyes when viewed from above, even though the worker is not notified about an utilization method of the recess 6, the worker is motivated to insert the sheet material peeling tool 10 into the recess 6. Accordingly, the worker can smoothly insert the distal end of the sheet material peeling tool 10 (may be a ballpoint pen and the like) into the recess 6 while allowing the sheet material peeling tool 10 to slidably contact with the inclined rear sidewall surface 6a.

Furthermore, in the present embodiment, the toner container 1 is provided on the upper surface thereof with the stepped part 3 in a position higher than the seat surface 2a. The stepped part 3 is provided on the straight line K passing through the center position in the width direction of the rear sidewall surface 6a (the inclined surface) and extending in the front and rear direction (the aforementioned intersection direction). Furthermore, the stepped part 3 serves as a fulcrum of a lever by abutting the intermediate part of the rod-like sheet material peeling tool 10 inserted into the recess 6.

According to such a configuration, peeling work of the sheet material 100 by the sheet material peeling tool 10 can be performed with a little force on the basis of the principle of leverage.

Furthermore, in the present embodiment, the aforementioned stepped part 3 serves as a stepped part for forming the board accommodating recess 3a.

According to such a configuration, since it is not necessary to provide a dedicated stepped part serving as the fulcrum of the sheet material peeling tool 10, it is possible to save the material cost of the toner container 1 by the dedicated stepped part. Thus, it is possible to reduce the manufacturing cost of the toner container 1.

<<Modification Example 1>>

Figure 6:
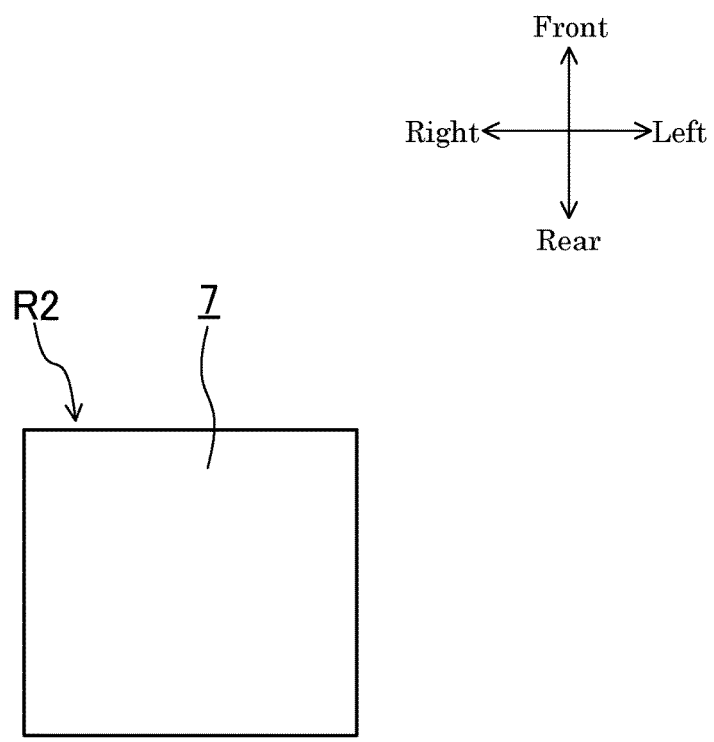
FIG. 6 is an enlarged plan view of a second region of an upper surface of a toner container.
Figure 7:
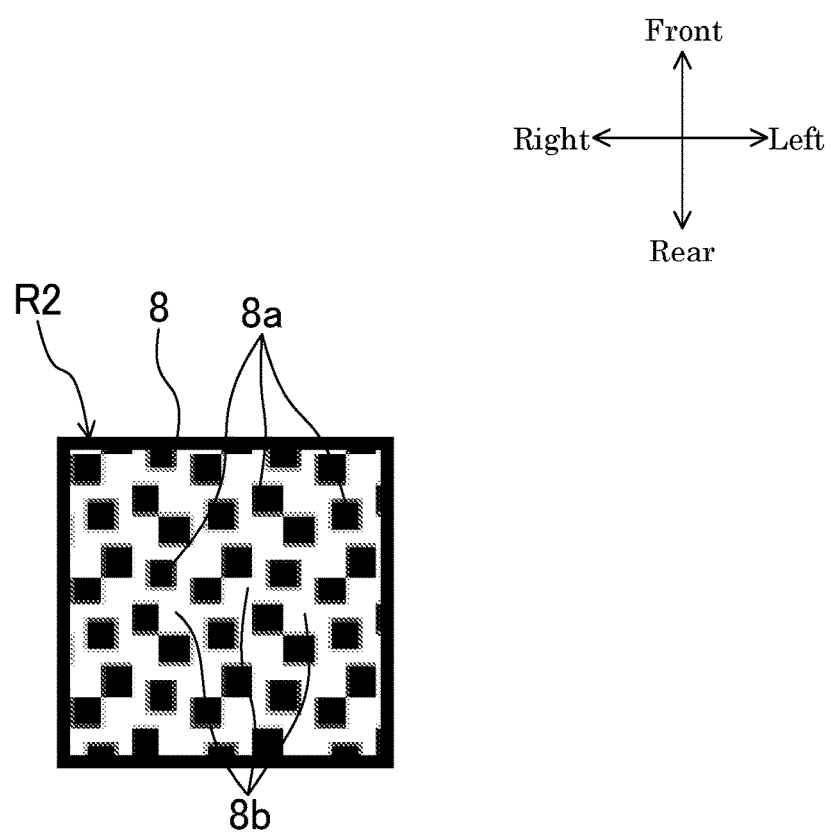
FIG. 7 is a view corresponding to FIG. 6, which illustrates a modification example 1.

FIG. 7 is a view corresponding to FIG. 6, which illustrates a modification example 1. The modification example 1 is different from the aforementioned embodiment 1 in terms of a configuration of the second region R2.

That is, in the present modification example, the second region R2 is a region mixedly including parts in contact with and parts not in contact with the adhesive surface 100a of the sheet material 100. Specifically, the second region R2 is configured by an embossed surface 8. The embossed surface 8 is a surface subjected to embossing, and for example, is formed by fine recess-convex parts. In the present modification example, convex parts 8a of the embossed surface 8 constitute parts contacting with the adhesive surface 100a of the sheet material 100, and recess 8b of the embossed surface 8 constitute parts not contacting with the adhesive surface 100a of the sheet material 100.

According to such a configuration, it is possible to easily separate the sheet material 100 while ensuring a certain degree of adhesive force with the sheet material 100 in the second region R2. Consequently, as compared with the aforementioned embodiment in which the second region R2 is configured with the recess 6, it is possible to facilitate the separation work of the sheet material 100 while enhancing the adhesive force of the sheet material 100 with respect to the upper surface of the toner container 1.

<<Modification Example 2>>

Figure 8:
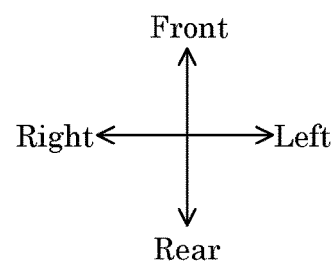
FIG. 8 is a view corresponding to FIG. 6, which illustrates a modification example 2.
Figure 8:
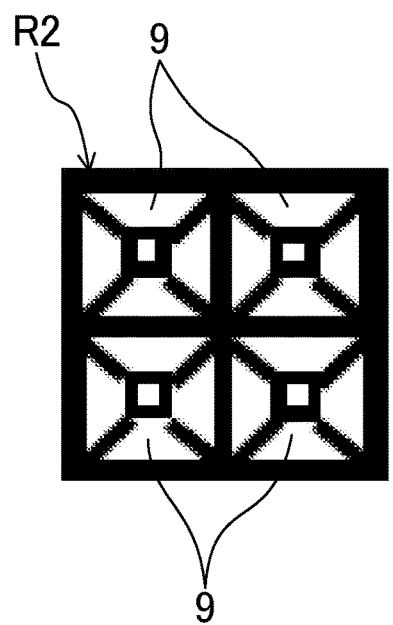

FIG. 8 is a view corresponding to FIG. 6, which illustrates a modification example 2. The modification example 2 is different from the aforementioned embodiment 1 and modification example 1 in terms of a configuration of the second region R2.

That is, in the present modification example, the second region R2 is a region mixedly including parts in contact with and parts not in contact with the adhesive surface 100a of the sheet material 100, and is configured by arranging a plurality of pyramid-like convex parts 9 adjacently to one another. In the present modification example, the number of convex parts 9 is four and each of the convex parts 9 is formed in a square pyramid shape. The four convex parts 9 are juxtaposed in the second region R2 in two row and two columns. In this example, each of the convex parts 9 is formed in the square pyramid shape; however, the technology of the present disclosure is not limited thereto and for example, each of the convex parts 9 may have a triangular pyramid shape or a pentagonal pyramid shape. Furthermore, the number of convex parts 9 is not limited to 4 and may be 3 or less or 5 or more.

In the present modification example, it is possible to precisely manage an area ratio of contact parts and non-contact parts, as compared with the aforementioned modification example 1 in which the second region R2 is formed by the embossed surface 8. Accordingly, it is possible to precisely manage the adhesive force of the sheet material 100 in the second region R2. Thus, for example, when many toner containers 1 for recycling are collected and one worker performs separation work of the sheet material 100, it is possible to always perform the peeling work with constant force. Thus, it is possible to facilitate the separation work of the sheet material 100.

<<Modification Example 3>>

Figure 9:
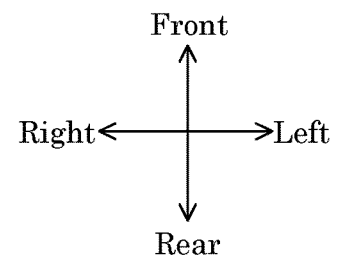
FIG. 9 is an enlarged plan view of a first region in a modification example 3.
Figure 9:
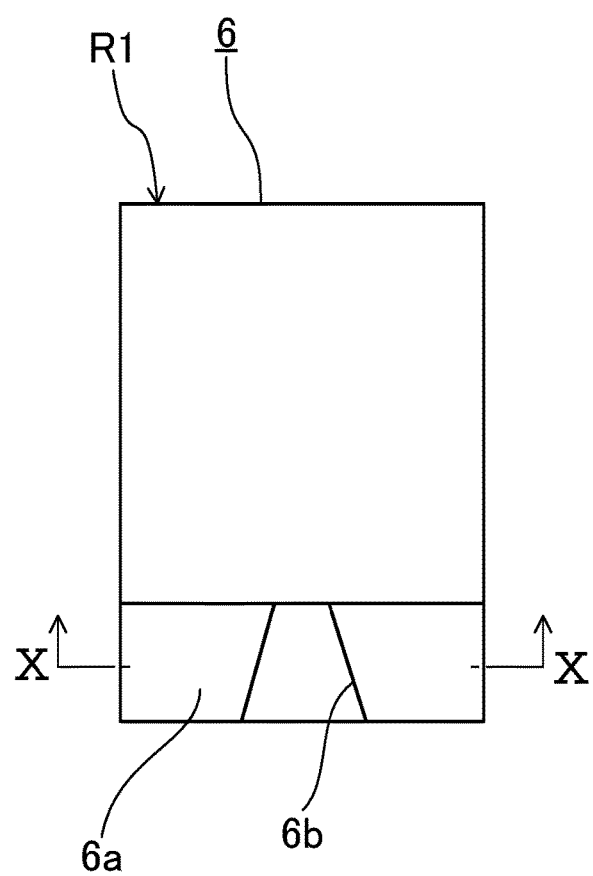
Figure 10:
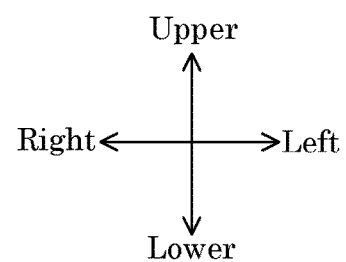
FIG. 10 is a sectional view taken along line X-X of FIG. 9.
Figure 10:
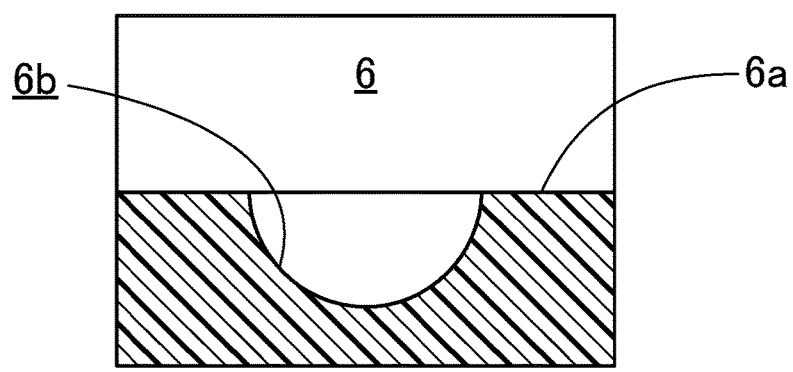

FIG. 9 is an enlarged plan view of the first region R1 in a modification example 3 and FIG. 10 is a sectional view taken along line X-X of FIG. 9. In this modification example, a semi-conical recess 6b is formed in the rear sidewall surface 6a of the recess 6 such that a diameter of its distal end side is reduced. According to such a configuration, for example, when a ballpoint pen having a tapered distal end and the like are used as the sheet material peeling tool 10, it is possible to smoothly guide the distal end part into the recess 6 along the surface of the semi-conical recess 6b.

<<Other Embodiments>>

The aforementioned embodiment has described the toner container 1 as an example of a component in which the sheet material 100 is adhered to a surface thereof; however, the technology of the present disclosure is not limited thereto and any components may be used as long as in the sheet material 100 can be adhered thereto.

What is claimed is:

1. A component having a surface to which a sheet material having an adhesive surface is adhered, wherein
    an adhesive target region on a surface of the component, to which the sheet material is adhered, is provided at a peripheral edge thereof with a first region including a recess that allows a predetermined sheet material peeling tool to be insertable to a side of the adhesive surface of the sheet material, and a second region positioned in the vicinity of the first region, and the second region includes a region mixedly including a part in contact with the adhesive surface and a part not in contact with the adhesive surface, the region being configured by an embossed surface or by a plurality of pyramid-shaped convex parts arranged adjacent to one another.

2. The component of claim 1, wherein the number of second regions is two, and the two second regions are juxtaposed along the peripheral edge of the adhesive target region to be symmetrically positioned with the first region interposed therebetween.

3. A component having a surface to which a sheet material having an adhesive surface is adhered, wherein an adhesive target region on a surface of the component, to which the sheet material is adhered, is provided at a peripheral edge thereof with a first region including a recess that allows a predetermined sheet material peeling tool to be insertable to a side of the adhesive surface of the sheet material, and a second region positioned in the vicinity of the first region, and the second region includes a region not in contact with the adhesive surface of the sheet material or a region mixedly including a part in contact with the adhesive surface and a part not in contact with the adhesive surface, the recess constituting the first region is formed to intersect the peripheral edge of the adhesive target region when viewed from a vertical direction of the adhesive target region, and a wall surface of the recess, which is positioned at an outer side of the adhesive target region in an intersection direction, is an inclined surface which is inclined to a bottom side of the recess toward an inner side from the outer side of the intersection direction, the sheet material peeling tool is a rod-shaped member having a distal end part insertable into the recess, the component is provided on a surface thereof with a stepped part at a position higher than the surface to which the sheet material is adhered, and the stepped part is provided on a straight line passing through a center position in a width direction of the inclined surface and extending in the intersection direction, and is configured to serve as a fulcrum of a lever by abutting an intermediate part of the rod-shaped member inserted into the recess.

4. The component of claim 3, wherein the component is a toner container which is mounted in an image forming apparatus, the toner container includes a communication board that transmits identification information toward the image forming apparatus in a state in which the toner container has been mounted in the image forming apparatus, and the stepped part has a board accommodating recess that accommodates the communication board and allows the communication board to be positioned at a predetermined height.

5. The component of claim 3, wherein the inclined surface is formed with a semi-conical recess having a diameter which is reduced toward inner side from the outer side of the intersection direction.

* * * * *